US012687059B2

(12) United States Patent
Mcvey et al.

(10) Patent No.: US 12,687,059 B2
(45) Date of Patent: Jul. 21, 2026

(54) MULTI-SPRING-LOADED ACTUATORS

(71) Applicant: Raytheon Company, Tewksbury, MA (US)

(72) Inventors: Ray E. Mcvey, Redondo Beach, CA (US); Scott R. Foes, Torrance, CA (US)

(73) Assignee: RAYTHEON COMPANY, Tewksbury, MA (US)

( * ) Notice: Subject to any disclaimer, the term of this patent is extended or adjusted under 35 U.S.C. 154(b) by 161 days.

(21) Appl. No.: 18/539,254

(22) Filed: Dec. 13, 2023

(65) Prior Publication Data

US 2025/0198210 A1 Jun. 19, 2025

(51) Int. Cl.
*E05F 1/12* (2006.01)
*E05B 15/00* (2006.01)
(Continued)

(52) U.S. Cl.
CPC ............ *E05F 1/1207* (2013.01); *E05B 15/00* (2013.01); *E05B 17/0062* (2013.01);
(Continued)

(58) Field of Classification Search
CPC ....... E05F 1/1207; E05F 1/1215; E05F 1/002; E05F 1/004; E05F 1/006; B64G 1/222;
(Continued)

(56) References Cited

U.S. PATENT DOCUMENTS

| | | | | |
|---|---|---|---|---|
| 2,645,446 A * | 7/1953 | Ulrich | ...................... | H04M 1/04 403/120 |
| 5,564,163 A * | 10/1996 | Lowry | .................. | G06F 1/1681 16/342 |

(Continued)

FOREIGN PATENT DOCUMENTS

| | | | |
|---|---|---|---|
| CA | 3212700 A1 * | 9/2022 | ........... B64G 1/2229 |
| CN | 111409874 A | 7/2020 | |
| CN | 114750980 A | 7/2022 | |

OTHER PUBLICATIONS

Notification of Transmittal of the International Search Report and the Written Opinion of the International Searching Authority, or the Declaration; PCT/US2024/053580; Feb. 10, 2025, 13 pages.

(Continued)

*Primary Examiner* — William L Miller
(74) *Attorney, Agent, or Firm* — CANTOR COLBURN LLP

(57) ABSTRACT

Multi-spring-loaded actuators can include a rotatable axis arranged to rotate relative to a fixed frame, and multiple loaded springs, each having a rotational potential and being operationally attached to the rotatable axis to cause the rotatable axis to rotate in a first direction (or a second direction) when its rotational potential is released (sequentially). Each loaded spring is associated with a one-time release mechanism operationally coupled to a respective loaded spring to retain the loaded spring with a potential until the one-time release mechanism is spent causing the loaded spring to release. By firing the one-time release mechanism and unloading loaded springs sequentially, a rotatable axis can move a first article relative to a second article, typically in a bi-directional manner.

21 Claims, 5 Drawing Sheets

(51) Int. Cl.
*E05B 17/00* (2006.01)
*E05B 47/00* (2006.01)

(52) U.S. Cl.
CPC ..... *E05B 47/0002* (2013.01); *E05Y 2201/214* (2013.01); *E05Y 2201/462* (2013.01); *E05Y 2999/00* (2024.05)

(58) Field of Classification Search
CPC ... B64G 1/2222; B64G 1/645; E05B 17/0062; E05B 47/0002; E05B 15/00; E05Y 2999/00; E05Y 2201/214; E05Y 2201/462; E05Y 2800/21; E05Y 2800/244
See application file for complete search history.

(56) References Cited

U.S. PATENT DOCUMENTS

| | | | | |
|---|---|---|---|---|
| 5,716,030 | A | 2/1998 | LaFiandra et al. | |
| 5,716,157 | A * | 2/1998 | Kester | B64G 1/645 403/291 |
| 5,810,296 | A | 9/1998 | Izumi | |
| 7,644,890 | B2 | 1/2010 | Quincieu | |
| 8,955,194 | B2 * | 2/2015 | Teta | E05F 1/006 16/222 |
| 9,546,008 | B1 * | 1/2017 | Santos Soto | B64G 1/443 |
| 9,761,401 | B1 * | 9/2017 | Vega | H01H 85/36 |
| 10,676,217 | B2 * | 6/2020 | Spark | B64G 1/2228 |
| 10,926,891 | B2 * | 2/2021 | Spark | B64G 1/2224 |
| 11,053,722 | B2 * | 7/2021 | Teta | E05D 3/02 |
| 11,072,964 | B2 * | 7/2021 | Teta | E05F 1/006 |
| 11,148,831 | B2 * | 10/2021 | Spark | B64G 1/2222 |
| 11,148,834 | B2 * | 10/2021 | Spark | B64G 1/443 |
| 11,428,039 | B2 * | 8/2022 | Docksteader | E05F 15/72 |
| 11,549,296 | B2 * | 1/2023 | Bucklin | E05F 1/1207 |
| 12,281,509 | B2 * | 4/2025 | Opgenorth | E05F 1/006 |
| 12,338,668 | B2 * | 6/2025 | Smith | E05F 1/006 |
| 2013/0247329 | A1 * | 9/2013 | Teta | E05F 1/006 16/48.5 |
| 2019/0144142 | A1 | 5/2019 | Spark | |
| 2019/0390503 | A1 * | 12/2019 | Teta | E05F 1/006 |
| 2023/0003067 | A1 | 1/2023 | Bucklin et al. | |

OTHER PUBLICATIONS

Mohtar et al., Actuated Cover Door With Emercency Opening Function for Space Telescopes, European Space Mechanisms and Tribology Symposium, 2021, 8 pages, OHB Italia.
NASA, NLAS Dispenser, https://www.nasa.gov/image-article/nlas-dispenser/, Nov. 5, 2015, 2 pages.
Frangibolt Video #1—https://www.youtube.com/watch?v=5KMd4dQlges, Feb. 24, 2012.
Frangibolt Video #2—https://www.youtube.com/watch?v=sAcMNq6ia-Y, Feb. 28, 2014.

* cited by examiner

MULTI-SPRING-LOADED ACTUATORS

GOVERNMENT LICENSE RIGHTS

This disclosure was made with Government support. The Government has certain rights to the disclosure.

BACKGROUND

Hinges and other mechanisms that relate to the movement of objects back and forth relative to one another are often manually actuated, e.g. doors, windows, lids, etc. However, in some industries, there is significant utility to providing automation. Thus, many technologies exist that utilize actuators to drive hinges and other mechanisms, e.g., rotational, telescoping, etc. Examples include hinges to drive doors, lids, covers, etc. Many actuator driven hinges or similar devices use electrical or other types of motors to provide back and forth actuation, for example. However, these types of actuated hinges can have several drawbacks, particularly when used in certain industries, such as aerospace, nuclear, chemical, etc. For example, motors can have some issues related to lack of covertness, contamination control, thermal control, solar protection, inconvenient failures, etc. As such, it would be desirable to provide an actuator that is highly reliable even in harsh environments and can provide for at least bi-directional movement of articles relative to one another.

DETAILED DESCRIPTION

Figure 1A:
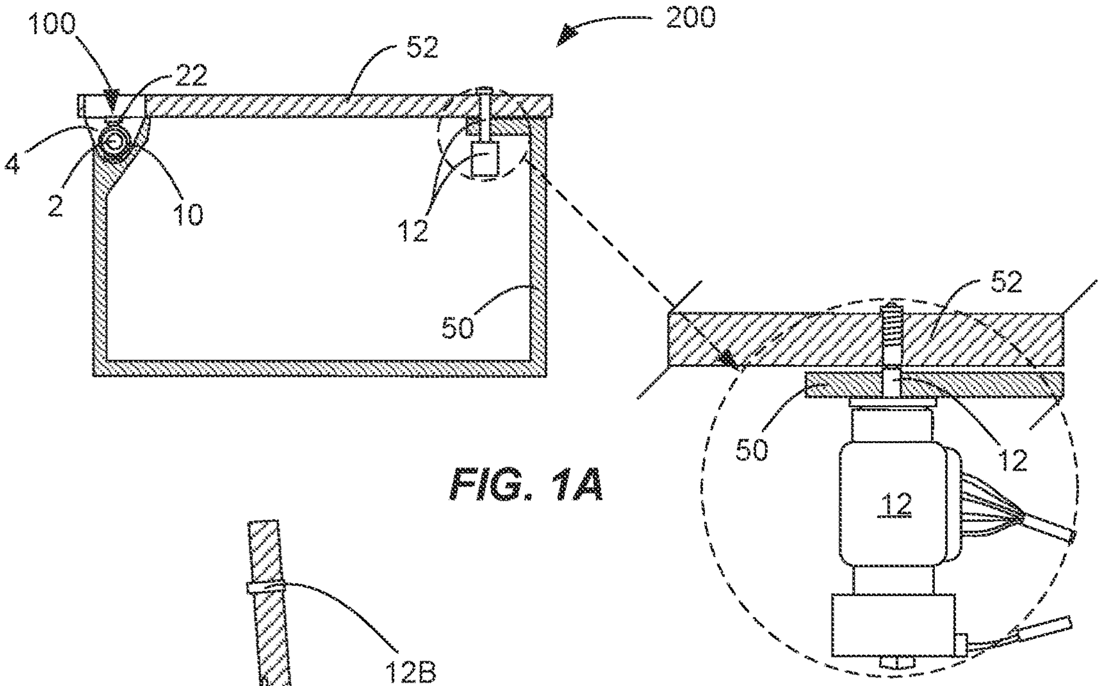
FIG. 1A illustrates an example multi-spring-loaded actuator positioned on a housing with a lid as part of a multi-spring-loaded actuator system prior to opening the lid for the first time in accordance with the present disclosure.

In accordance with the present disclosure, a multi-spring-loaded actuator can include a rotatable axis arranged to rotate relative to a fixed frame, a first loaded spring having a first rotational potential attached to the rotatable axis to cause the rotatable axis to rotate in a first direction when the first rotational potential of the first loaded spring is released, and a first one-time release mechanism coupled to the first loaded spring to retain the first loaded spring at the first potential until the first one-time release mechanism is spent causing the first loaded spring to release. In further detail, the multi-spring-loaded actuator can include a second loaded spring having a second rotational potential attached to the rotatable axis to cause the rotatable axis to rotate in a second direction opposite the first direction when a second rotational potential of the second loaded spring is released subsequent to release of the first loaded spring, and a second one-time release mechanism coupled to the second loaded spring to retain the second loaded spring at the second rotational potential until the second one-time release mechanism is spent causing the second loaded spring to release and rotate the rotatable axis in the second direction opposite the first direction.

Regarding certain additional example details of the multi-spring-loaded actuator, the actuator can include, for example, a third loaded spring having a third rotational potential attached to the rotatable axis to cause the rotatable axis to rotate in the first direction when a third rotational potential of the third loaded spring is released subsequent to release of the first loaded spring and the second loaded spring, and a third one-time release mechanism coupled to the third loaded spring to retain the third loaded spring at the third rotational potential until the third one-time release mechanism is spent causing the third loaded spring to release and rotate the rotatable axis in the first direction. In further detail, the multi-spring-loaded actuator may include a fourth loaded spring having a fourth rotational potential attached to the rotatable axis to cause the rotatable axis to rotate in the second direction when a fourth rotational potential of the fourth loaded spring is released subsequent to release of the first loaded spring, the second loaded spring, and the third loaded spring, and a fourth one-time release mechanism coupled to the fourth loaded spring to retain the fourth loaded spring at the fourth rotational potential until the fourth one-time release mechanism is spent causing the fourth loaded spring to release and rotate the rotatable axis in the second direction. In some examples, the fixed frame can be attached to a first article, and the rotatable axis is attached to a second article, wherein rotation of the rotatable axis in the first direction causes a first motion of the second article relative to the first article and rotation of the rotatable axis in the second direction causes a second motion of the second article relative to the first article. The first article, for example, can be a housing and the second article can be a cover for the housing. Upon the first motion and the second motion of the cover, the cover opens then closes or the cover closes then opens relative to the housing. In other examples, the second article may include a solar panel, a calibration source, etc. The first one-time-release mechanism, the second one-time-release mechanism, or both, can include, for example, one or more of a frangible, an explosive, or an electromagnet. In some examples, the multi-spring-loaded actuator can be in the form of a bi-directional hinge actuator, a bi-directional telescoping actuator, or a bi-directional rotational actuator.

In another example, a multi-spring-loaded actuator system can include a first article attached to a fixed frame that supports a rotatable axis that rotates relative to the fixed frame, and a second article operationally associated for movement relative to the first article. The multi-spring-loaded actuator system can further include a first loaded spring having a first rotational potential attached to the rotatable axis to cause the rotatable axis to rotate in a first direction when the first rotational potential of the first loaded spring is released, and an off-actuator one-time release mechanism coupled to the second article to retain the first loaded spring at the first potential until the off-actuator one-time release mechanism is spent causing the first loaded spring to release. Furthermore, the multi-spring-actuator system can include a second loaded spring having a second rotational potential attached to the rotatable axis to cause the rotatable axis to rotate in a second direction opposite the first direction when a second rotational potential of the second loaded spring is released subsequent to release of the first loaded spring, and a second one-time release mechanism coupled to the second loaded spring to retain the second loaded spring at the second rotational potential until the second one-time release mechanism is spent causing the second loaded spring to release and rotate the rotatable axis in the second direction opposite the first direction.

Regarding additional details related to the multi-spring-loaded actuator system, the system may include a third loaded spring having a third rotational potential attached to the rotatable axis to cause the rotatable axis to rotate in the first direction when a third rotational potential of the third loaded spring is released subsequent to release of the first loaded spring and the second loaded spring, and a third one-time release mechanism coupled to the third loaded spring to retain the third loaded spring at the third rotational potential until the third one-time release mechanism is spent causing the third loaded spring to release and rotate the rotatable axis in the first direction. In a more detailed example, the multi-spring-loaded actuator system can further include a fourth loaded spring having a fourth rotational potential attached to the rotatable axis to cause the rotatable axis to rotate in the second direction when a fourth rotational potential of the fourth loaded spring is released subsequent to release of the first loaded spring, the second loaded spring, and the third loaded spring, and a fourth one-time release mechanism coupled to the fourth loaded spring to retain the fourth loaded spring at the fourth rotational potential until the fourth one-time release mechanism is spent causing the fourth loaded spring to release and rotate the rotatable axis in the second direction. In some examples, the fixed frame can be attached to a first article, and the rotatable axis can be attached to a second article. Rotation of the rotatable axis in the first direction causes a first motion of the second article relative to the first article and rotation of the rotatable axis in the second direction causes a second motion of the second article relative to the first article. In additional examples, the first article can be a housing and the second article can be a cover for the housing. In this example, upon the first motion and the second motion of the cover, the cover opens then closes or the cover closes then opens relative to the housing.

In another example, a method of bi-directionally moving a second article relative to a first article can include discharging a first one-time-release mechanism to cause a first loaded spring attached to a rotatable axis to unload and rotate the rotatable axis in a first direction, and discharging a second one-time-release mechanism after discharging the first one-time-release mechanism to cause a second loaded spring attached to a rotatable axis to unload and rotate the rotatable axis in a second direction opposite the first direction. In this example, rotation in the first direction causes a first motion of a second article relative to a first article, and rotation in the second direction causes a second motion of the second article relative to a first article.

In additional detail regarding the methods herein, the first one-time release mechanism, for example, can be located on the second article, and the rotatable axis, the first loaded spring, the second one-time release mechanism, and the second loaded spring can be part of a multi-spring-loaded actuator located on the first article. In other examples, the rotatable axis, the first one-time release mechanism, the first loaded spring, the second one-time release mechanism, and the second loaded spring can be part of a multi-spring-loaded actuator located on the first article. In other examples, discharging the first one-time-release mechanism, the second one-time-release mechanism, or both includes discharging one or more of a frangible, an explosive, or an electromagnet. Furthermore, the multi-spring-loaded actuator can in some instances be in the form of a bi-directional hinge actuator, a bi-directional telescoping actuator, or a bi-directional rotational actuator.

As a note, with respect to the multi-spring-loaded actuators, the multi-spring-loaded actuator systems, and the methods of bi-directionally moving a second article relative to a first article, specific descriptions with respect to one example can be considered applicable to other examples whether or not they are explicitly discussed in the context of that example. Thus, for instance, in discussing a first loaded spring related to the multi-spring-loaded actuators, such disclosure is also relevant to and directly supported in context of the systems and methods also described herein, and vice versa.

The terms used herein will have their ordinary meaning in the relevant technical field unless specified otherwise. Some terms are specifically defined herein that pertain to the present disclosure and appended claims and should be understood herein as specifically defined, taken in context with the plain meaning of those defined terms.

The term “multi-spring-loaded actuator” refers to actuators, as exemplified herein, that include at least two loaded springs that are pre-set to actuate articles in different directions, respectively, when the actuator is installed on one or both of the articles. The multiple loaded springs are configured to be sequentially unloaded through the sequential decoupling or firing of multiple one-time release mechanisms. In operation, the multi-spring-loaded actuator can be configured to move a first article relative to a second article, move a second article relative to a first article, or move a first article and a second article relative to one another. Example structures of multi-spring-loaded actuator configurations can include a hinge assembly for opening and shutting a second article relative to a first article (e.g., opening and shutting a lid relative to the housing or a door relative to a frame), a rotational assembly for rotating a second article such as a rotational stage relative to a first article about an axis (e.g., bi-directional rotation of a calibration source), a telescoping assembly (e.g., bi-directional in and out movement of a mechanism, such as a shutter, within a telescope housing), or the like.

The term "multi-spring-loaded actuator system" refers to assemblies including a multi-spring-loaded actuator, but the actuator is assembled as part of a system, e.g., attached to a first article and a second article that are actuated relative to one another. In some examples, the multiple loaded springs can be released sequentially by one-time release mechanisms present on the multi-spring-loaded actuator, or alternatively, one or more of the one-time release mechanisms may be present "off-actuator," (e.g., present on a hinged article, an article of a rotational stage, a telescoping article, etc.). The off-actuator one-time release mechanism may still be mechanically associated with one or more of the loaded springs so that when the off-actuator one-time release mechanism is fired (e.g., explosive or frangible mechanism) or decoupled (e.g., electromagnetic release mechanism), the loaded springs are unloaded causing the multi-spring-loaded actuator to rotationally turn and then turn back in the opposite direction, respectively.

The term "one-time release mechanism" refers to any structure that can be fired, decoupled, or spent to unload a pre-loaded spring positioned about and mechanically connected to a rotational axis to cause the rotational axis to rotate in a direction, e.g., a first direction or a second (typically opposite) direction. Examples include frangible devices, e.g., frangible bolts; explosive release compositions or devices, e.g. explosive adhesive, blasting caps, etc.; or electromagnets. Electromagnetics are not typically known as having a "one-time release mechanism," but in the context of the actuators and systems described herein, the spring loaded movement after decoupling would position the electromagnetic too far away for the structure to be reversed from its unloaded spring configuration back to its loaded spring configuration. So, in that sense, electromagnetic when used as described herein is considered to be a one-time release mechanism.

Figure 1B:
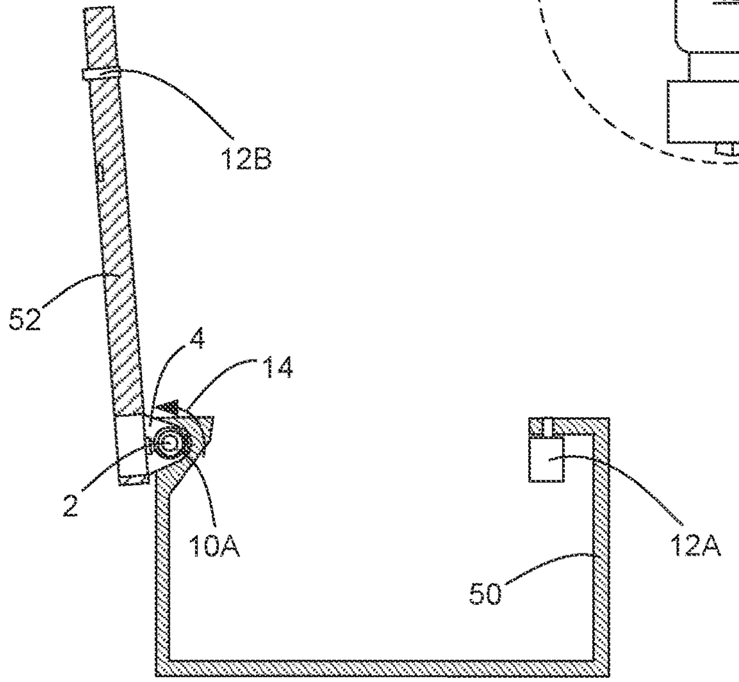
FIG. 1B illustrates the multi-spring-loaded actuator system of FIG. 1A after opening the lid for the first time in accordance with the present disclosure.
Figure 1C:
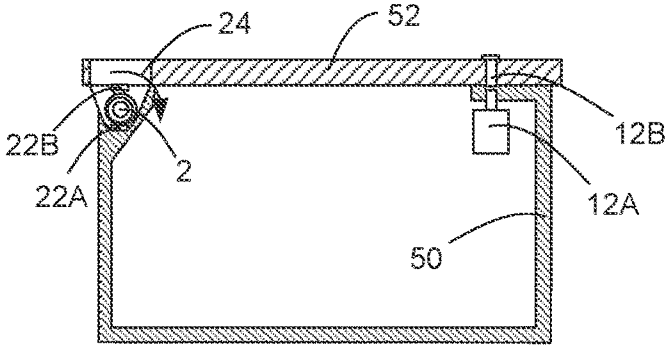
FIG. 1C illustrates the multi-spring-loaded actuator system of FIGS. 1A and 1B after re-closing the lid following the first opening of the lid in accordance with the present disclosure.

Referring now to FIGS. 1A-1C, a multi-spring-loaded actuator 100 as part of a multi-spring-loaded actuator system 200 is shown. An example multi-spring-loaded actuator is shown by way of example in more detail in FIGS. 2-3E. Thus, FIG. 1 is provided to illustrate an example multi-spring-loaded actuator system in accordance with the present disclosure. The multi-spring-loaded actuator system in this example illustrates a first article 50 attached to a fixed frame 4 that supports a rotatable axis 2 that rotates relative to the fixed frame, and a second article 52 operationally associated for movement relative to the first article. In this example, the first article is a housing and the second article is a lid that can be opened and closed multiple times. The multi-spring-loaded actuator system can further include a first loaded spring 10 having a first rotational potential (biased to open the lid) attached to the rotatable axis to cause the rotatable axis to rotate in a first direction 14 when the first rotational potential of the first loaded spring is released, and an off-actuator one-time release mechanism 12 coupled to the second article to retain the first loaded spring at the first potential until the off-actuator one-time release mechanism is spent, thereby causing the first loaded spring to release and open the lid. In this example, the first one-time release mechanism 12 is shown as a broken frangible bolt at 12A and 12B in FIG. 1B. Furthermore, the multi-spring-actuator system can include a second loaded spring (not shown, but shown in FIGS. 2-3E) having a second rotational potential (biased to close the lid) attached to the rotatable axis to cause the rotatable axis to rotate in a second direction 24 opposite the first direction when a second rotational potential of the second loaded spring is released (subsequent to release of the first loaded spring). The second loaded spring is held with its potential with the lid in the open position (see FIG. 1B) until a second one-time release mechanism 22 is fired or otherwise decoupled. In this example, the second one-time release mechanism is shown as a broken frangible bolt at 22A and 22B in FIG. 1C, thus causing the second loaded spring to become unloaded to close the lid again over the open housing as the rotational axis rotates in a second direction, which is opposite the first direction in this example.

As shown, the one-time release mechanisms 12 and 22, which in this instance are frangibles (sometimes referred to as a frangible nut, a frangible bolt, etc., depending on the arrangement), which are devices used in many industries, including the aerospace industry, to sever mechanical connections. For example, a frangible is commonly described as an explosively-splittable component that can separate upon introduction of an electrical signal. In some instances, one portion may remain intact with one of the structures while the other portion is separate therefrom. One example may include a bolt with a frangible nut that is broken off in one or more parts. Regardless of the structure or arrangement, the frangibles suitable for use can include at least two portions which become separated when electrically energized. For example, when a frangible nut or other structure is separated from a frangible bolt, the bolt may sometimes remain with one of the first article or the second article. The nut itself can be split into two or more parts and can be shed, or can remain with the other of the first article or the second article. Other types of frangibles can likewise be used. Though a frangible is shown in FIGS. 1A-1C by way of example, it is noted that other types of devices can be used for the one-time release mechanism, such as an explosive composition or component, an electromagnet, or other similar composition or structure suitable for one-time release.

In additional examples, the first article and/or second article can be a structure other than a housing and a lid, respectively. For example, the first article can include a frame, a support structure, a capsule, etc. The second article can be, for example, a solar panel, a calibration source, etc. To illustrate, the first and second articles can be arranged as part of a multi-spring-loaded actuator system that includes a bi-directional hinge actuator, a bi-directional telescoping actuator, or a bi-directional rotational actuator. In instances where there is an off-actuator one-time release mechanism, that particular one-time release mechanism is not part of the bi-directional hinge actuator, the bi-directional telescoping actuator, or the bi-directional rotational actuator, but rather is an "off-actuator," working together with the multi-spring loaded actuator to release the first loaded spring. Notably, in other examples, all of the loaded springs may be associated with one-time release mechanisms that are included onboard the multi-spring-loaded actuator.

Figure 2:
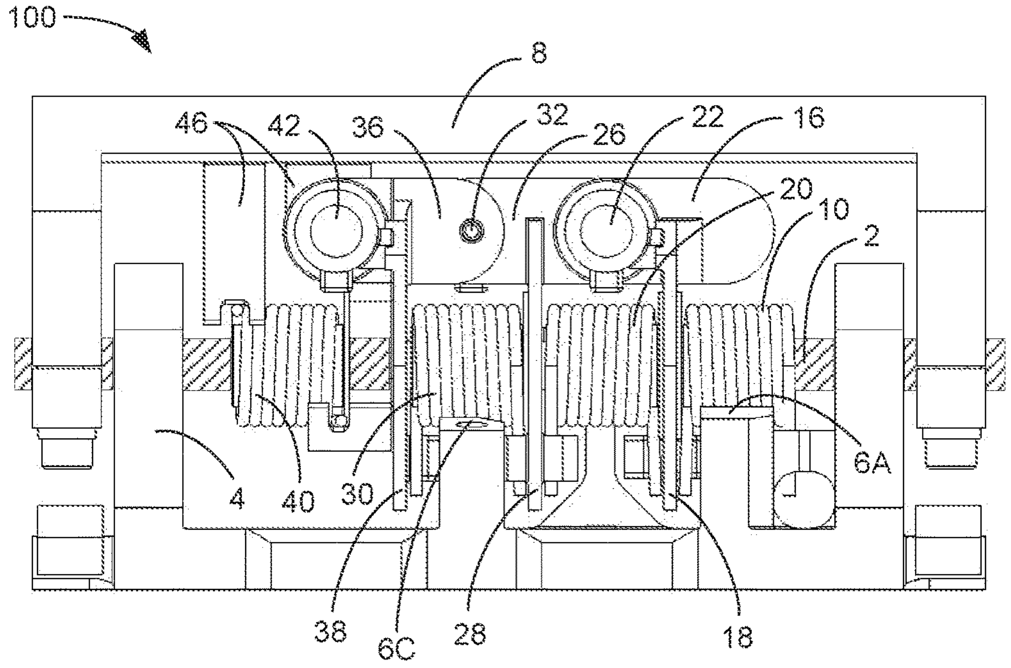
FIG. 2 illustrates an example front view of a multi-spring-loaded actuator suitable for use with a multi-spring-loaded actuator system in accordance with the present disclosure.

A detailed front view of an example multi-spring-loaded actuator 100 that can be used in a multi-spring-loaded actuator system is shown in FIG. 2. As an initial note, the multi-spring loaded actuator shown in FIG. 2 is designed without a first one-time release mechanism onboard, so with this particular arrangement, the first one-time release mechanism would be an off-actuator one-time release mechanism, which is not shown in this example, but is shown by way of example in FIG. 1A at 12). It is noted that the off-actuator one-time release mechanism could be designed so to be a first one-time release mechanism, e.g., a frangible, explosive, electromagnet, etc., that is present onboard the multi-spring-loaded actuator.

Regarding the structures shown in FIG. 2, the multi-spring-loaded actuator 100 includes a rotatable axis 2 that is supported by a fixed frame 4. The rotatable axis in this example is fixedly joined with a rotatable frame portion 8 that rotates with the rotatable axis. Prior to release of the off-axis one-time release mechanism (not shown in FIG. 2), the multi-spring-loaded actuator is at rest with all of its four loaded springs 10, 20, 30, and 40, loaded with potential for rotating the rotatable frame portion sequentially in a bi-directional motion. For example, the first loaded spring 10 has potential to rotate the rotatable axis with the rotatable frame portion in a first (rotational) direction, with the rotatable frame portion rotating in a Z-axis direction, e.g., into or out of the plane of the x,y-axis plane shown. The second loaded spring 20 has potential to rotate the rotatable axis along with the rotatable frame portion in a second (rotational) direction that is opposite the first direction. The third loaded spring 30 has potential to rotate the rotatable axis along with the rotatable frame portion in a third (rotational) direction, which is the same direction as the first direction. The fourth loaded spring 40 has potential to rotate the rotatable axis along with the rotatable frame portion in a fourth (rotational) direction, which is the same direction as the second direction. Thus, this particular multi-spring-loaded actuator is configured for four (4) alternating motions, which can be suitable for opening and closing a second article relative to a first article, as shown in FIGS. 1A-1C.

Releasing the potential of the four loaded springs 10, 20, 30, and 40 can occur respectively by sequentially firing or decoupling a corresponding first one-time release mechanism (not shown, as this mechanism is an "off-actuator"), followed by a second one-time release mechanism 22, followed by a third one-time release mechanism 32, and then followed by a fourth one-time release mechanism 42. As shown in FIG. 2, the electromagnetic firing mechanism is shown for the second and fourth one-time release mechanisms (with the frangible "nut" being obscured on the back side), and the frangible "nut" is shown for the third one-time release mechanism (with the electromagnetic firing mechanism being obscured on the back side). Again, the first one-time-release mechanism in this example is not present on the actuator, e.g., "off-actuator one-time release mechanism.

The multi-spring-loaded actuator shown in FIG. 2 also includes a series of breakaway couplers 16, 26, and 36, as well as a housing breakaway coupler 46 (for the final rotation in this particular example). The breakaway couplers are configured so that when the loaded springs are unloaded upon firing or decoupling the respective one-time release mechanism, the breakaway couplers may be stopped at a fixed location when the various couplers strike a stopper 6A-6D. Notably, some of the stoppers include a stopper opening to accommodate protrusions of its associated one-time release mechanism prior to firing or decoupling of that particular frangible. In this example, the various loaded springs 10, 20, 30, and 40 are separated from one another by rotatable flanges 18, 28, and 38, which are also mechanically coupled with the rotatable axis 2 so that when one of the loaded springs is unloaded, the rotatable flanges rotate with the rotatable axis, causing the breakaway couplers that have not been separated by the firing of an adjacent one-time release mechanism to likewise rotate.

Referring now to FIGS. 3A-3E, five (5) different configurations of the multi-spring-loaded actuator 100 are shown, illustrating the sequential operation of the multi-spring-loaded actuator. To illustrate a particular use of the multi-spring-loaded actuator illustrated in FIGS. 3A-3E, the example of the opening and closing of a lid relative to a housing is used, which is shown and described in relation to FIGS. 1A-1C. It is understood, however, that this is just one possible implementation that can be implemented, with others including opening and closing of other structures, rotational movement of other structures, telescoping action of other structures, etc. In additional detail, in order to avoid unnecessary redundancy in the description, all of the structures shown and described with respect to FIGS. 1A-2 are given the same reference numerals as those shown in FIGS. 3A-3E. Thus, not every reference numeral shown in FIGS. 3A-3E will necessarily be re-described in each of the various operational stages depicted in those FIGS.

Figure 3A:
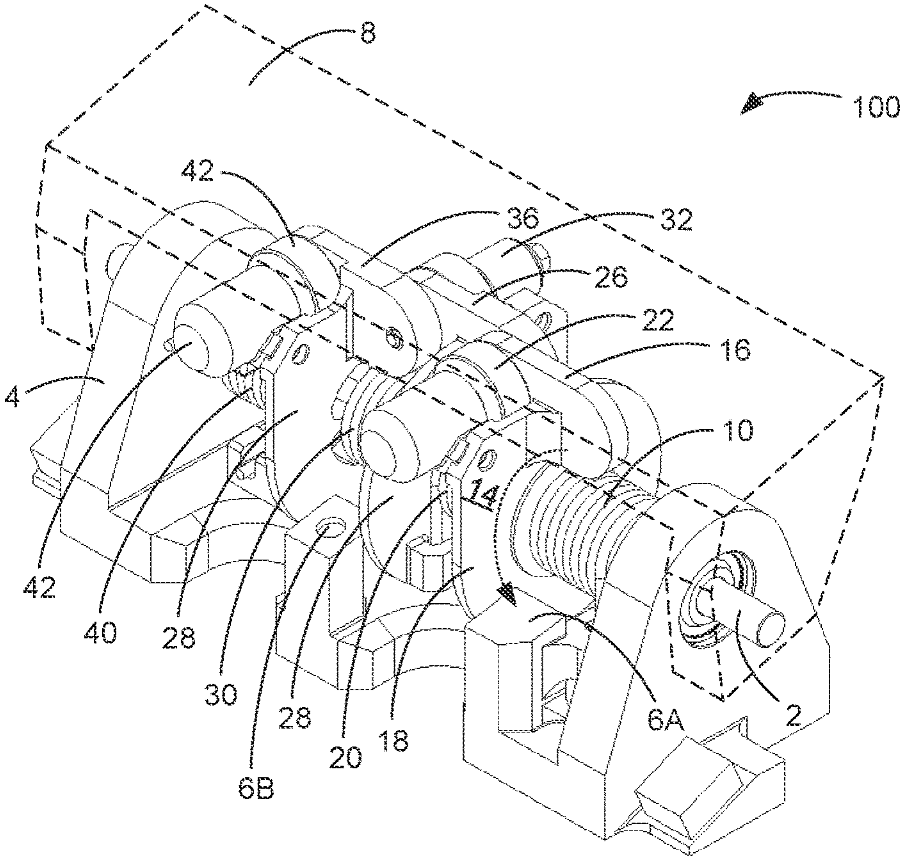
FIG. 3A illustrates a perspective view of the multi-spring-loaded actuator of FIG. 2 having a fixed frame and a rotatable frame portion in its initial position (e.g. initially closed) prior to unloading any of its multiple springs in accordance with the present disclosure.

Starting with FIG. 3A in particular as it relates to the opening and closing of a lid relative to a housing (not shown, but shown by example in FIGS. 1A-1C), the multi-spring-loaded actuator 100 is shown with all four loaded springs in their loaded configuration, each including enough spring-loaded potential to either open or close a lid relative to a housing. In summary, FIG. 3A illustrates the configuration of the multi-spring-loaded actuator when the lid (not shown) is in an initial closed position, followed by a first open position (FIG. 3B), then a second closed position (FIG. 3C), then a second open position (FIG. 3D), and then a third closed position (FIG. 3E), for a total of five (5) sequential configurations of the lid relative to the housing.

Figure 3B:
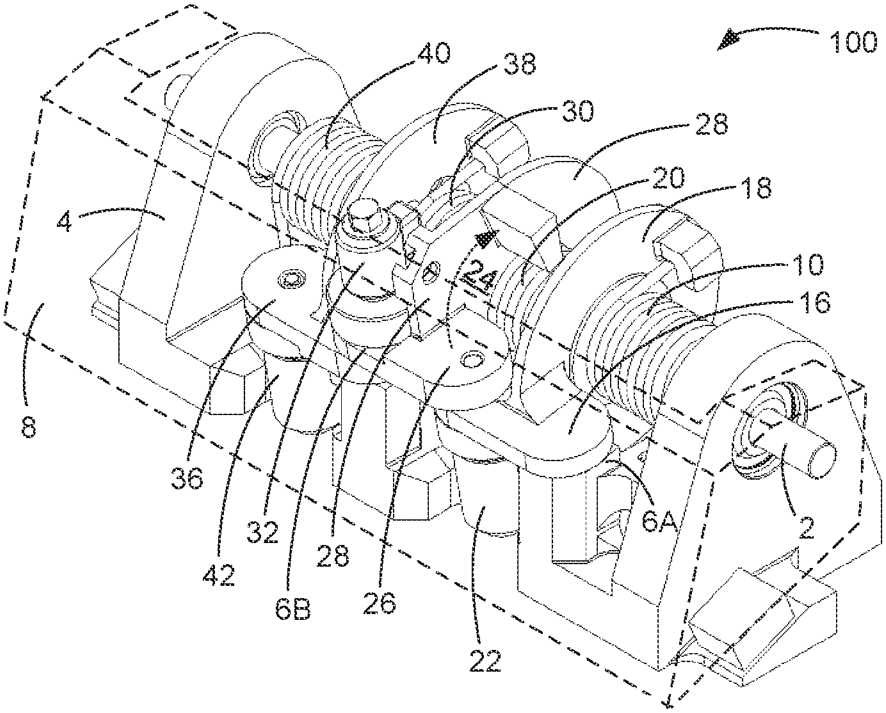
FIG. 3B illustrates a perspective view of the multi-spring-loaded actuator of FIG. 2 having a fixed frame and a rotatable frame portion in its first modified position (e.g., first opened) after unloading a first loaded spring in accordance with the present disclosure.

In operation, the initial configuration of the multi-spring-loaded actuator 100 is shown at FIG. 3A. As mentioned previously, this configuration is held static due to an off-axis one-time release mechanism (not shown), or frangible, that impermanently couples the lid with the housing in a closed position. When the off-axis one-time release mechanism is fired, the first loaded spring 10 may be unloaded due to the physical separation of the lid from the housing (not shown, but shown in FIGS. 1A-1C), or a first article relative to a second article if the multi-spring-loaded actuator is used with different types of structures, e.g., rotational, telescoping, etc. When unloaded, the rotational axis rotates in a first direction 14, causing the rotatable frame portion 8 and all of the breakaway couplers 16, 26, 36 to rotate also in the first direction until the first breakaway coupler 16 is stopped by its associated stopper 6A. Notably, none of the breakaway couplers have been separated yet due to the fact that the first one-time release mechanism is not present on the actuator. Upon completion of the first rotation, the rotatable frame portion 8 is rotated from its initial position to a second position, as shown in FIG. 3B. As an example, this configuration may provide a first open position in the case of the opening of a second article relative to a first article, e.g., lid and housing. Note that none of the breakaway couplers 16, 26, and 36 have been separated from one another at this stage, even though the first rotational action of the multi-spring-loaded actuator has occurred. Notably, if the multi-spring-loaded actuator included an onboard "first" one-time release mechanism, then there may be a reason to include an onboard breakaway coupler, similar to those shown at 16, 26, and 36.

Figure 3C:
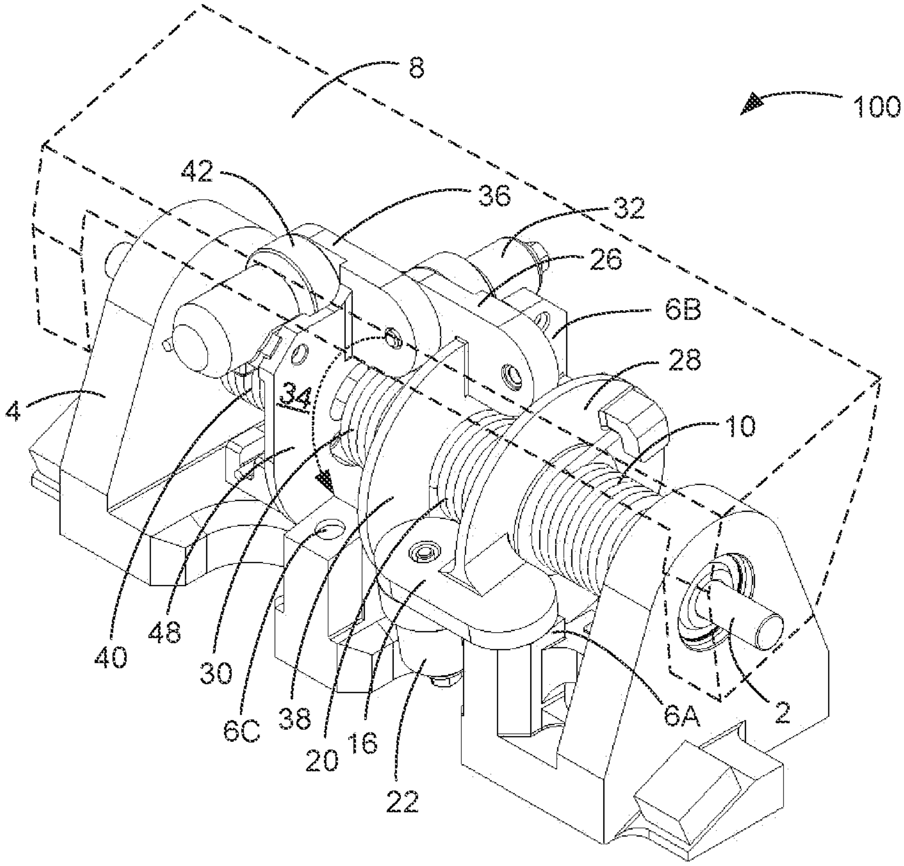
FIG. 3C illustrates a perspective view of the multi-spring-loaded actuator of FIG. 2 having a fixed frame and a rotatable frame portion in its second modified position (e.g., first closed, or re-closed) after unloading a second loaded spring in accordance with the present disclosure.

Referring now to FIGS. 3B and 3C together, which illustrates rotation of the multi-spring-loaded actuator 100 suitable for re-closing the lid relative to the housing (as shown in FIGS. 1A-1C), after the first loaded spring 10 has been successfully unloaded of its potential, a second loaded spring 20 may be unloaded by firing or decoupling the second one-time release mechanism 22, which will allow for separation of a first breakaway coupler 16 from a second breakaway coupler 26. The first breakaway coupler in this example remains in position against a stopper 6A, and the balance of the structure still connected to the rotatable axis 2 (supported by the fixed frame 4) rotates until the second breakaway coupler is stopped by another stopper 6B. In further detail, when the second loaded spring is unloaded, the rotational axis rotates in a second direction 24, causing the rotatable frame portion 8 and all of the remaining breakaway couplers 26 and 36 that have not been decoupled to rotate also in the second direction until the second breakaway coupler 26 is stopped by its associated stopper 6B. Upon completion of the second rotation in the second direction, the rotatable frame portion is rotated from its second (open) position to a third (re-closed) position, as shown in FIG. 3C.

Figure 3D:
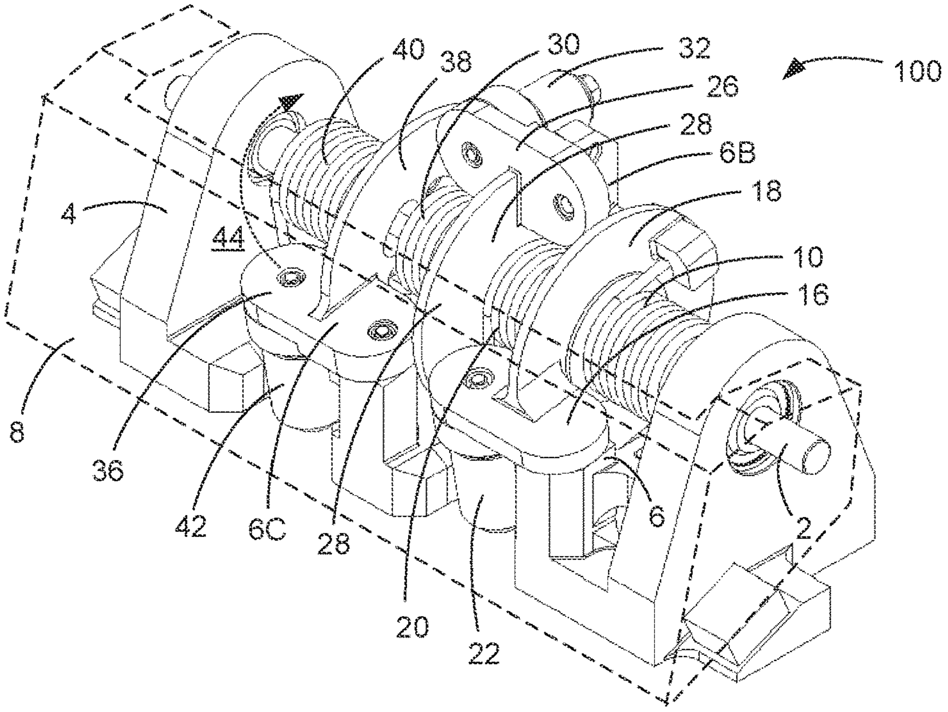
FIG. 3D illustrates a perspective view of the multi-spring-loaded actuator of FIG. 2 having a fixed frame and a rotatable frame portion in its fourth modified position (e.g., second opened, or re-opened) after unloading a third loaded spring in accordance with the present disclosure.

Referring now to FIGS. 3C and 3D together, which illustrates rotation of the multi-spring-loaded actuator 100 suitable for re-opening the lid relative to the housing, after the second loaded spring 20 has been successfully unloaded of its potential, a third loaded spring 30 may be unloaded by firing or decoupling the third one-time release mechanism 32, which will allow for separation of a second breakaway coupler 26 from a third breakaway coupler 36. The second breakaway coupler in this example remains in position against a stopper 6B, and the balance of the structure still connected to the rotatable axis 2 rotates until the third breakaway coupler is stopped by another stopper 6C. In other words, when the third loaded spring is unloaded, the rotational axis rotates in a third direction 34 (which is the same direction as the first direction 14), causing the rotatable frame portion 8 to rotate also in the third direction until the third breakaway coupler 36 is stopped by its associated stopper 6C. Upon completion of the third rotation in the third direction, the rotatable frame portion is rotated from its third (closed) position to a fourth (re-opened) position, as shown in FIG. 3D.

Figure 3E:
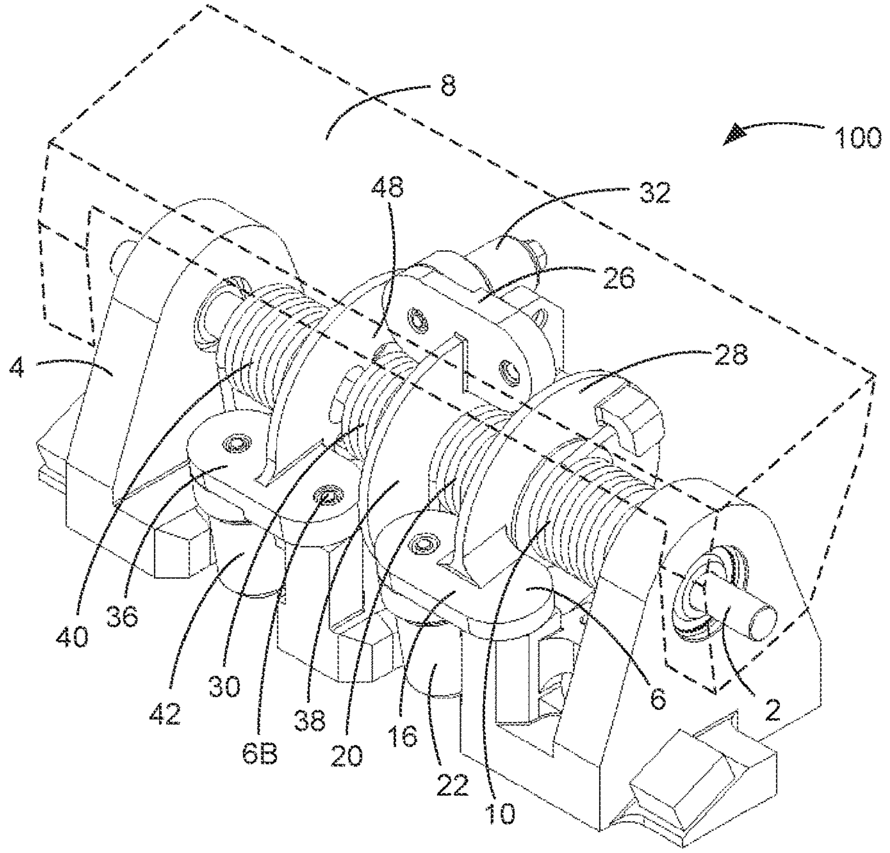
FIG. 3E illustrates a perspective view of the multi-spring-loaded actuator of FIG. 2 having a fixed frame and a rotatable frame portion in its fifth modified position (e.g., second closed, or re-closed again) after unloading a fourth loaded spring in accordance with the present disclosure.

Referring now to FIGS. 3D and 3E together, which illustrates rotation of the multi-spring-loaded actuator 100 suitable for re-closing the lid a second time relative to the housing, after the third loaded spring 30 has been successfully unloaded of its potential, a fourth loaded spring 40 may be unloaded by firing or decoupling the third one-time release mechanism 32, which will allow for separation of a third breakaway coupler 36 from a breakaway housing coupler (not shown in FIGS. 3A-3E to avoid obscuring other mechanisms, but shown at 46 in FIG. 2). The third breakaway coupler in this example remains in position against a stopper 6C, and the rotatable frame portion 8 which is still connected to the fourth loaded spring rotates with the rotatable axis 2, again re-closing (a second re-closing) the lid relative to the housing. In other words, when the fourth loaded spring is unloaded, the rotational axis rotates in a fourth direction 44 (which is the same direction as the second direction 24), causing the rotatable frame portion 8 to rotate in the fourth direction when the breakaway frame coupler (shown at 46 in FIG. 2) is separated from the third breakaway coupler 36. Notably, the breakaway frame coupler is operationally coupled with the fourth loaded spring, so when the fourth loaded spring is unloaded, the rotatable frame portion rotates, closing the lid (or causing another article to move) one last time. In other words, upon completion of the fourth rotation in the fourth direction, the rotatable frame portion is rotated from its fourth (opened) position to a fifth (re-closed) position, as shown in FIG. 3E.

Notably, though the multi-spring-loaded actuator shown can operate four (4) movement actions of a second article relative to a first article, fewer or more pairings of loaded springs and one-time release mechanisms (along with additional breakaway couplers) can be implemented to customize the number of actions, e.g., bi-directional actions, that can be carried out by the multi-spring-loaded actuator. This number of actions, for example, may be limited only by the number of sequentially arranged pairings of loaded springs and one-time release mechanism are positioned along the rotatable axis.

Figure 4:
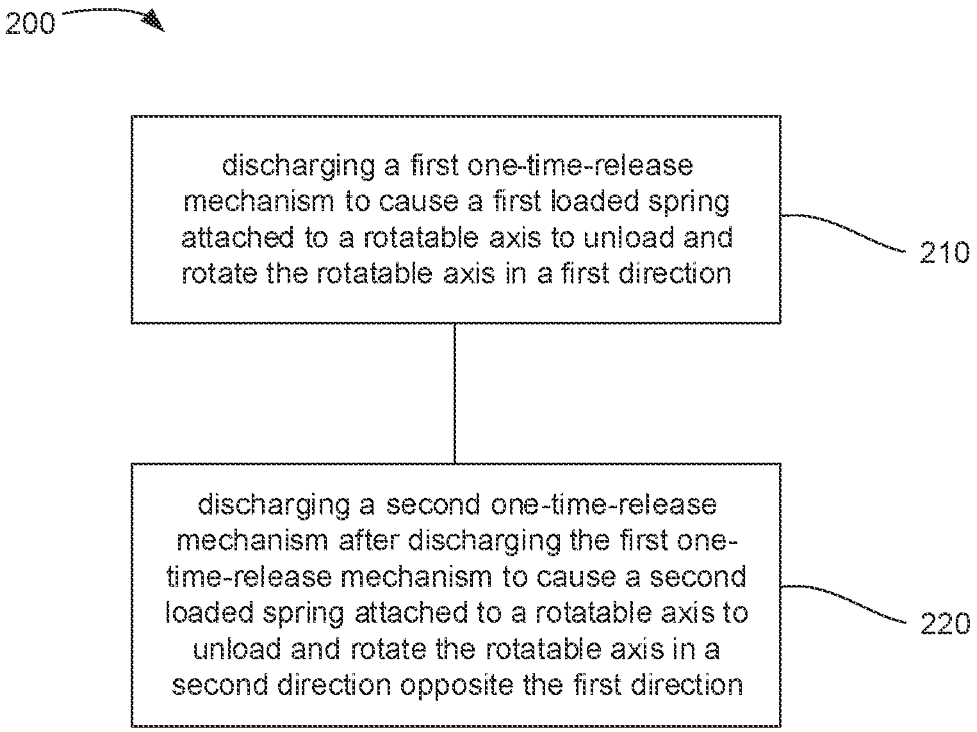
FIG. 4 illustrates a flow diagram of example methods of bi-directionally moving a second article relative to a first article in accordance with the present disclosure.

Referring now to FIG. 4, a method 200 of bi-directionally moving a second article relative to a first article can include discharging 210 a first one-time-release mechanism to cause a first loaded spring attached to a rotatable axis to unload and rotate the rotatable axis in a first direction, and discharging 220 a second one-time-release mechanism after discharging the first one-time-release mechanism to cause a second loaded spring attached to a rotatable axis to unload and rotate the rotatable axis in a second direction opposite the first direction. In this example, rotation in the first direction causes a first motion of a second article relative to a first article, and rotation in the second direction causes a second motion of a second article relative to a first article.

In additional detail regarding the methods herein, the first one-time release mechanism, for example, can be located on the second article, and the rotatable axis, the first loaded spring, the second one-time release mechanism, and the second loaded spring can be part of a multi-spring-loaded actuator located on the first article. In other examples, the rotatable axis, the first one-time release mechanism, the first loaded spring, the second one-time release mechanism, and the second loaded spring can be part of a multi-spring-loaded actuator located on the first article. In other examples, discharging the first one-time-release mechanism, the second one-time-release mechanism, or both, includes discharging one or more of a frangible, an explosive, or an electromagnet. Furthermore, the multi-spring-loaded actuator can in some instances be in the form of a bi-directional hinge actuator, a bi-directional telescoping actuator, or a bi-directional rotational actuator.

In accordance with the present disclosure, it is noted that no specific order is required in the methods disclosed herein, though generally in some examples, method steps can be carried out sequentially. It is also understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting. Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the disclosure can be practiced without one or more of the specific details, or with other methods, components, materials, etc. In other instances, well-known structures, materials, or operations are not shown or described in detail to avoid obscuring aspects of the disclosure.

While the foregoing examples are illustrative of the principles of the disclosure in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the disclosure be limited, except as by the claims set forth below.

What is claimed is:

1. A multi-spring-loaded actuator, comprising:

a rotatable axis arranged to rotate relative to a fixed frame;

a first loaded spring having a first rotational potential attached to the rotatable axis to cause the rotatable axis to rotate in a first direction when the first rotational potential of the first loaded spring is released;

a first one-time release mechanism coupled to the first loaded spring to retain the first loaded spring at the first potential until the first one-time release mechanism is spent causing the first loaded spring to release;

a second loaded spring having a second rotational potential attached to the rotatable axis to cause the rotatable axis to rotate in a second direction opposite the first direction when a second rotational potential of the second loaded spring is released subsequent to release of the first loaded spring; and a second one-time release mechanism coupled to the second loaded spring to retain the second loaded spring at the second rotational potential until the second one-time release mechanism is spent causing the second loaded spring to release and rotate the rotatable axis in the second direction opposite the first direction.

2. The multi-spring-loaded actuator of claim 1, further comprising:

a third loaded spring having a third rotational potential attached to the rotatable axis to cause the rotatable axis to rotate in the first direction when a third rotational potential of the third loaded spring is released subsequent to release of the first loaded spring and the second loaded spring; and a third one-time release mechanism coupled to the third loaded spring to retain the third loaded spring at the third rotational potential until the third one-time release mechanism is spent causing the third loaded spring to release and rotate the rotatable axis in the first direction.

3. The multi-spring-loaded actuator of claim 2, further comprising:

a fourth loaded spring having a fourth rotational potential attached to the rotatable axis to cause the rotatable axis to rotate in the second direction when a fourth rotational potential of the fourth loaded spring is released subsequent to release of the first loaded spring, the second loaded spring, and the third loaded spring; and a fourth one-time release mechanism coupled to the fourth loaded spring to retain the fourth loaded spring at the fourth rotational potential until the fourth one-time release mechanism is spent causing the fourth loaded spring to release and rotate the rotatable axis in the second direction.

4. The multi-spring-loaded actuator of claim 1, wherein the fixed frame is attached to a first article, and the rotatable axis is attached to a second article, wherein rotation of the rotatable axis in the first direction causes a first motion of the second article relative to the first article and rotation of the rotatable axis in the second direction causes a second motion of the second article relative to the first article.

5. The multi-spring-loaded actuator of claim 4, wherein the first article is a housing and the second article is a cover for the housing, wherein upon the first motion and the second motion of the cover, the cover opens then closes or the cover closes then opens relative to the housing.

6. The multi-spring-loaded actuator of claim 4, wherein when the second article includes a solar panel or a calibration source.

7. The multi-spring-loaded actuator of claim 1, wherein the first one-time-release mechanism, the second one-time-release mechanism, or both, include one or more of a frangible, an explosive, or an electromagnet.

8. The multi-spring-loaded actuator of claim 1, wherein the multi-spring-loaded actuator is in the form of a bi-directional hinge actuator, a bi-directional telescoping actuator, or a bi-directional rotational actuator.

9. A multi-spring-loaded actuator system, comprising:

a first article attached to a fixed frame, wherein the fixed frame supports a rotatable axis that rotates relative to the fixed frame;

a second article operationally associated for movement relative to the first article;

a first loaded spring having a first rotational potential attached to the rotatable axis to cause the rotatable axis to rotate in a first direction when the first rotational potential of the first loaded spring is released;

an off-actuator one-time release mechanism coupled to the second article to retain the first loaded spring at the first potential until the off-actuator one-time release mechanism is spent causing the first loaded spring to release;

a second loaded spring having a second rotational potential attached to the rotatable axis to cause the rotatable axis to rotate in a second direction opposite the first direction when a second rotational potential of the second loaded spring is released subsequent to release of the first loaded spring; and a second one-time release mechanism coupled to the second loaded spring to retain the second loaded spring at the second rotational potential until the second one-time release mechanism is spent causing the second loaded spring to release and rotate the rotatable axis in the second direction opposite the first direction.

10. The multi-spring-loaded actuator system of claim 9, further comprising:

a third loaded spring having a third rotational potential attached to the rotatable axis to cause the rotatable axis to rotate in the first direction when a third rotational potential of the third loaded spring is released subsequent to release of the first loaded spring and the second loaded spring; and a third one-time release mechanism coupled to the third loaded spring to retain the third loaded spring at the third rotational potential until the third one-time release mechanism is spent causing the third loaded spring to release and rotate the rotatable axis in the first direction.

11. The multi-spring-loaded actuator system of claim 10, further comprising:

a fourth loaded spring having a fourth rotational potential attached to the rotatable axis to cause the rotatable axis to rotate in the second direction when a fourth rotational potential of the fourth loaded spring is released subsequent to release of the first loaded spring, the second loaded spring, and the third loaded spring; and a fourth one-time release mechanism coupled to the fourth loaded spring to retain the fourth loaded spring at the fourth rotational potential until the fourth one-time release mechanism is spent causing the fourth loaded spring to release and rotate the rotatable axis in the second direction.

12. The multi-spring-loaded actuator system of claim 9, wherein the rotatable axis is attached to the second article, wherein rotation of the rotatable axis in the first direction causes a first motion of the second article relative to the first article and rotation of the rotatable axis in the second direction causes a second motion of the second article relative to the first article.

13. The multi-spring-loaded actuator system of claim 12, wherein the first article is a housing and the second article is a cover for the housing, wherein upon the first motion and the second motion of the cover, the cover opens then closes or the cover closes then opens relative to the housing.

14. The multi-spring-loaded actuator system of claim 12, wherein when the second article includes a solar panel or a calibration source.

15. The multi-spring-loaded actuator system of claim 9, wherein the off-actuator one-time-release mechanism, the second one-time-release mechanism, or both, include one or more of a frangible, an explosive, or an electromagnet.

16. The multi-spring-loaded actuator system of claim 9, wherein the first loaded spring, the second loaded spring, and the second one-time release mechanism are included as part of a bi-directional hinge actuator, a bi-directional telescoping actuator, or a bi-directional rotational actuator, and wherein the off-actuator one-time release mechanism is not part of the bi-directional hinge actuator, the bi-directional telescoping actuator, or the bi-directional rotational actuator.

17. A method of bi-directionally moving a second article relative to a first article, comprising:

discharging a first one-time-release mechanism to cause a first loaded spring attached to a rotatable axis to unload and rotate the rotatable axis in a first direction, wherein rotation in the first direction causes a first motion of the second article relative to the first article; and discharging a second one-time-release mechanism after discharging the first one-time-release mechanism to cause a second loaded spring attached to the rotatable axis to unload and rotate the rotatable axis in a second direction opposite the first direction, wherein rotation in the second direction causes a second motion of the second article relative to the first article.

18. The method of claim 17, wherein the first one-time release mechanism is located on the second article, and wherein the rotatable axis, the first loaded spring, the second one-time release mechanism, and the second loaded spring are part of a multi-spring-loaded actuator located on the first article.

19. The method of claim 18, wherein the multi-spring-loaded actuator is in the form of a bi-directional hinge actuator, a bi-directional telescoping actuator, or a bi-directional rotational actuator.

20. The method of claim 17, wherein the rotatable axis, the first one-time release mechanism, the first loaded spring, the second one-time release mechanism, and the second loaded spring are part of a multi-spring-loaded actuator located on the first article.

21. The method of claim 17, wherein discharging the first one-time-release mechanism, the second one-time-release mechanism, or both, includes discharging one or more of a frangible, an explosive, or an electromagnet.

* * * * *